United States Patent [19]

Sussich et al.

[11] Patent Number: 5,234,589

[45] Date of Patent: Aug. 10, 1993

[54] FILTER ASSEMBLY

[75] Inventors: Marino R. Sussich; Paul J. Sussich, both of Melbourne, Australia

[73] Assignee: Kagisho Pty. Ltd., Melbourne, Australia

[21] Appl. No.: 785,285

[22] Filed: Oct. 30, 1991

Related U.S. Application Data

[63] Continuation-in-part of Ser. No. 410,601, Sep. 21, 1989, Pat. No. 5,089,132.

[30] Foreign Application Priority Data

Apr. 20, 1989 [AU] Australia .................... PJ3788

[51] Int. Cl.$^5$ ............................................. B01D 21/28
[52] U.S. Cl. ..................................... 210/297; 210/298; 210/305; 210/306; 210/359; 210/448
[58] Field of Search ............... 210/297, 298, 299, 305, 210/306, 310, 316, 319, 320, 384, 385, 448, 521, 523, 359, 446

[56] References Cited

U.S. PATENT DOCUMENTS

| | | |
|---|---|---|
| 1,035,653 | 8/1912 | Stubbe . |
| 1,094,321 | 4/1914 | Finch ................... 210/305 |
| 1,367,783 | 2/1921 | Krumwiede .......... 210/305 |
| 1,723,374 | 8/1929 | Roehr . |
| 2,823,804 | 2/1958 | Myring . |
| 4,371,437 | 2/1983 | Iwasaki et al. . |
| 4,388,187 | 6/1983 | Eaglestone . |
| 5,089,132 | 2/1992 | Sussich et al. ....... 210/298 |

FOREIGN PATENT DOCUMENTS

| | | |
|---|---|---|
| 1421890 | 9/1988 | U.S.S.R. . |
| 324294 | 1/1930 | United Kingdom . |
| 841818 | 7/1960 | United Kingdom ......... 210/448 |

Primary Examiner—Matthew O. Savage
Attorney, Agent, or Firm—Merchant, Gould, Smith, Edell, Welter & Schmidt

[57] ABSTRACT

A filter assembly for filtering contaminants from liquid. A housing has a filtering chamber and an inlet port and an outlet port communicating with the chamber for flow of liquid therethrough. Filter media is located in the filtering chamber for filtering contaminants from liquid flowing through the filter media to the outlet port. A sump region is provided in the filtering chamber at the bottom thereof below the inlet port. Contaminants in the liquid entering the chamber from the inlet port tend to gravitate toward the sump region for collection. A separator member is located in the filtering chamber below the inlet port. This separator member substantially separates the filter media and sump region, and gravitating contaminants gravitate from the inlet port to the separator member. The separator member provides for communication of the gravitated contaminants into the sump region but tends to trap those contaminants in the sump region.

15 Claims, 3 Drawing Sheets

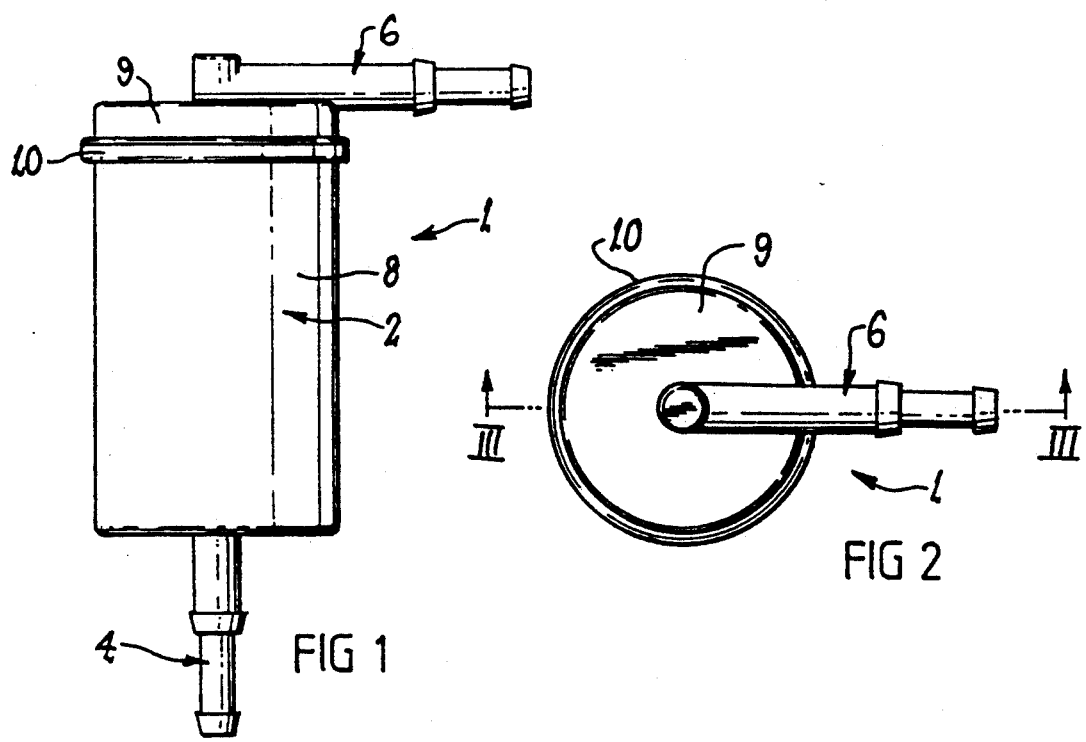
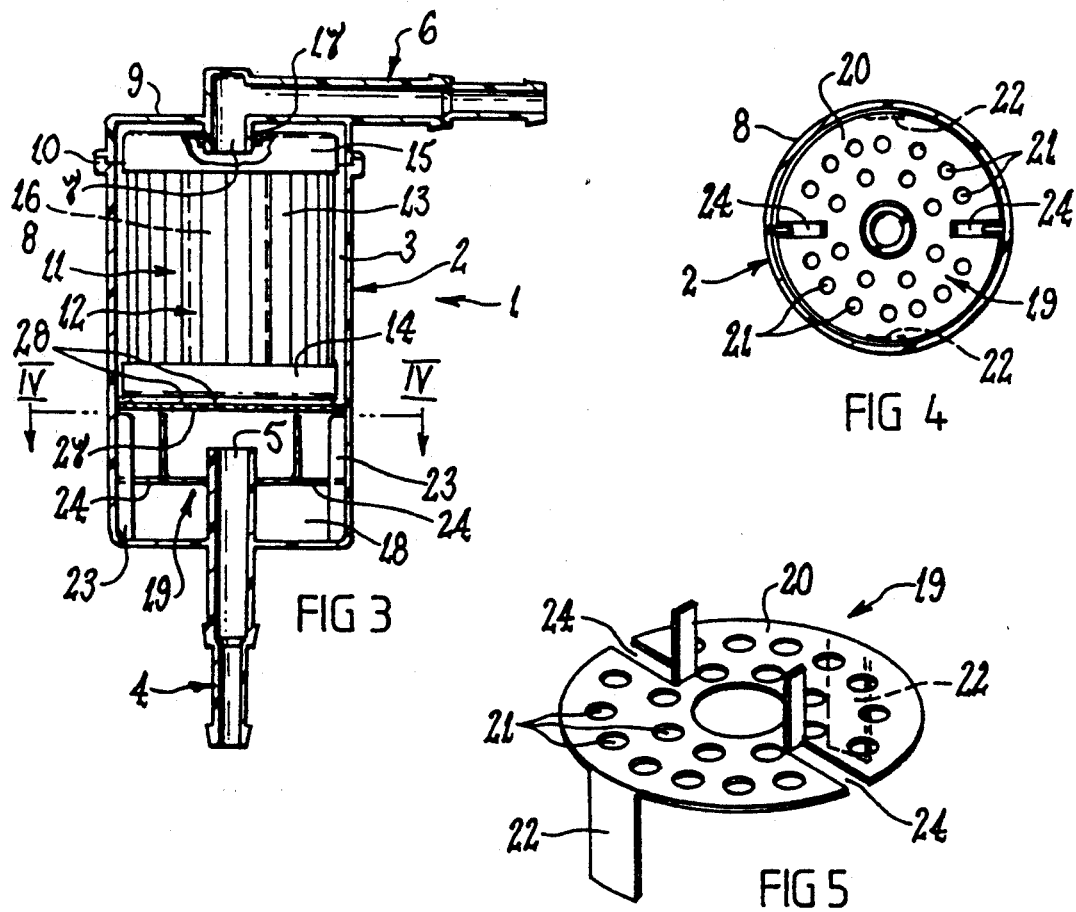

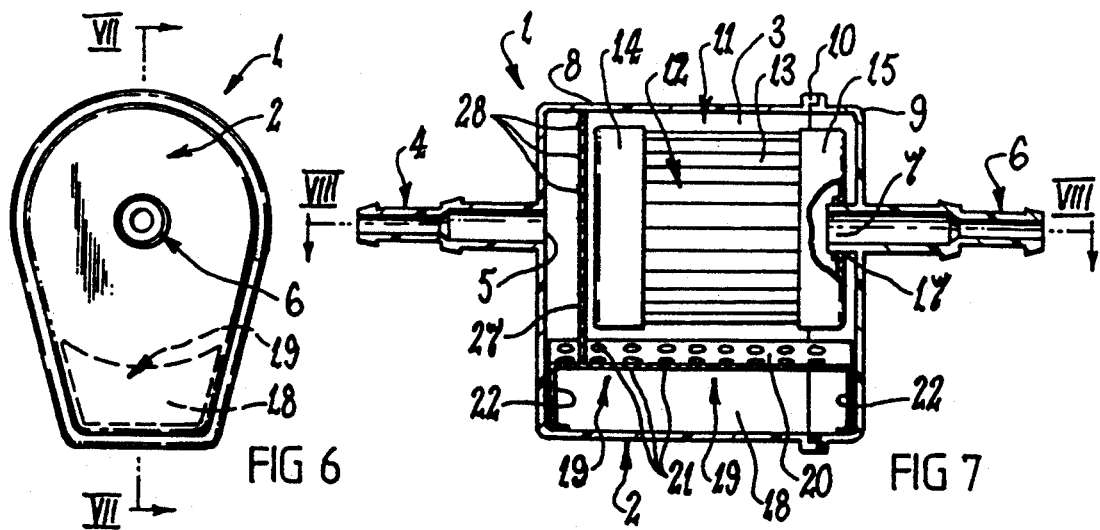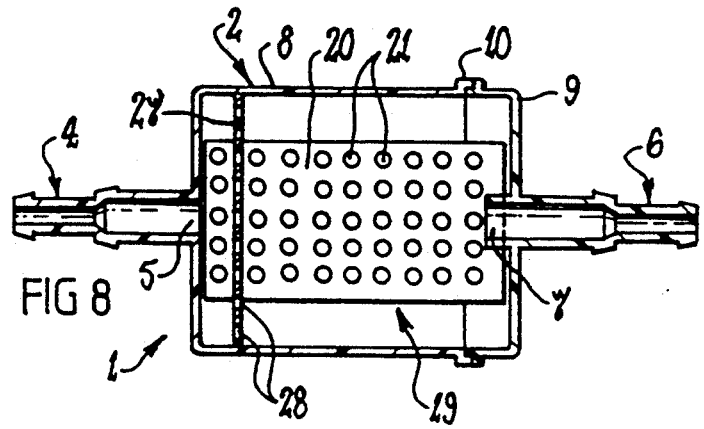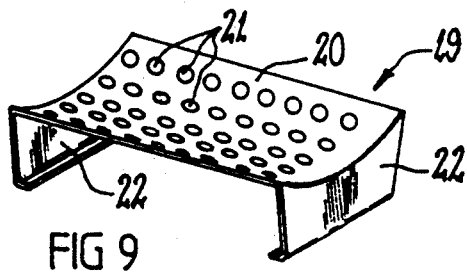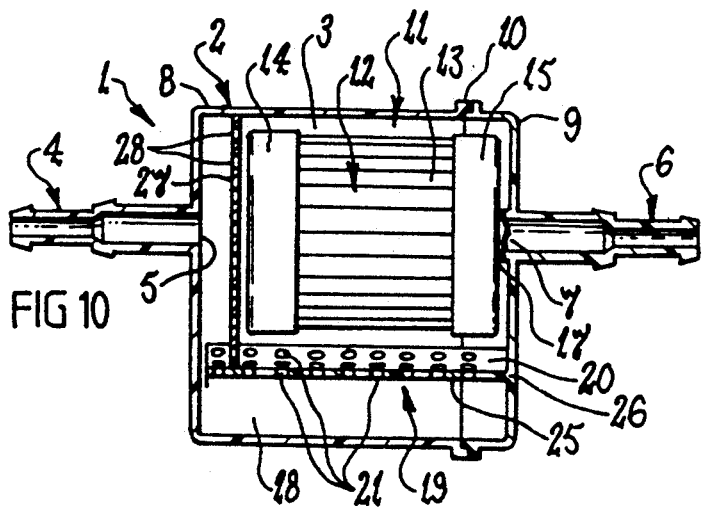

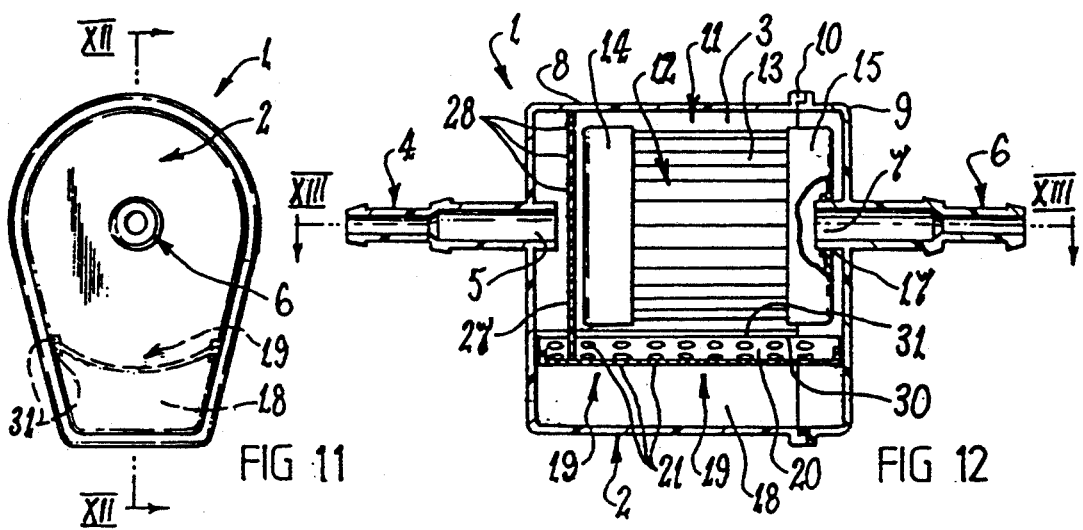
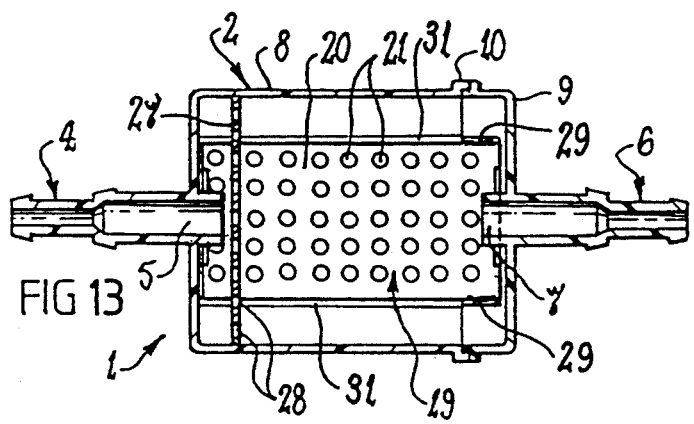
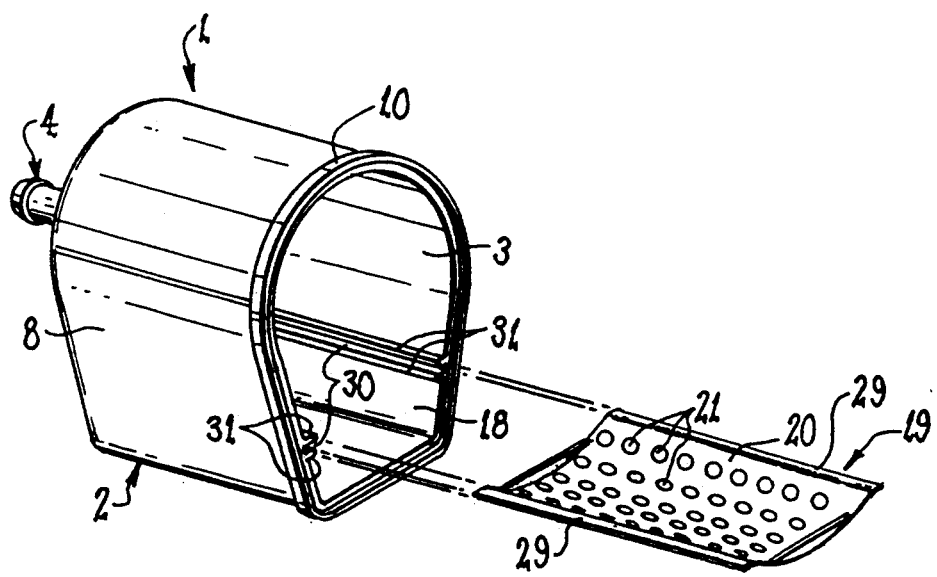

5,234,589

FILTER ASSEMBLY

RELATED APPLICATION

This is a continuation-in-part of application Ser. No. 07/410,601 filed 21 September 1989, now U.S. Pat. No. 5,089,132.

BACKGROUND OF THE INVENTION

1. Field of the Invention

This invention relates generally to filtration of contaminants from liquids, and more particularly to a filter assembly for filtering contaminants from liquid fuels. The filter assembly is applicable for filtering petroleum and other hydrocarbon based fuels used to power internal combustion engines, such as vehicle engines, and it will be convenient to hereinafter describe the invention in relation to that exemplary application. It is to be appreciated, however, that the invention is not limited to that application.

2. Description of the Related Art

It is common practice to install a fuel filter assembly in a fuel line of petrol and diesel powered internal combustion engines. The function of the assembly is to remove particulate contaminants, such as dirt, from the fuel before the fuel is delivered to the combustion chambers of the engine. If such contaminants are allowed to enter the combustion chambers then engine damage may be caused.

Filter assemblies which are currently used suffer the disadvantage that when the fuel contains more contaminants than can be trapped by the assembly, that assembly becomes clogged and no longer functions effectively. This can cause particulate contaminants to pass to the engine causing damage. Further, filter assemblies currently used are generally ineffective in removing liquid contaminants, such as water, from the fuel.

SUMMARY OF THE INVENTION

It is an object of the present invention to provide an improved filter assembly which overcomes, or at least alleviates, the problems of known filter assemblies.

With that object in mind, the present invention broadly provides a filter assembly for filtering contaminants from liquid, including: a housing providing a filtering chamber and having an inlet port and an outlet port communicating with the chamber for flow of liquid therethrough. Filter media is positioned in the filtering chamber for filtering contaminants from liquid flowing from the inlet port through the filter media to the outlet port. A sump region is provided in the filtering chamber at the bottom thereof and spaced below the inlet port and toward which contaminants in the liquid entering the filtering chamber from the inlet port tend to gravitate for collection. A separator member is located in the filtering chamber below the inlet port so as to substantially separate the filter media and sump region and so that gravitating contaminants gravitate from the inlet port to the separator member. The separator member moves during use of the filter assembly, the movement facilitating separation of contaminants from the liquid entering through the inlet port and collection of contaminants in the sump region. The separator member provides for communication of the contaminants into the sump region of the contaminants which have gravitated to the separator member and the separator member tending to trap therein the contaminants from the liquid received in the sump region.

In at least one embodiment, the separator member moves relative to the housing during use of the filter assembly. This movement facilitates separation of the contaminants from the liquid and their collection in the sump region. The separator member is preferably retained in the filtering chamber for vibratory movement caused by housing movement during use of the filter assembly.

In one arrangement, the separator member is preferably connected to the housing for its location within the filtering chamber. However, that connection permits the separator member to move relative to the housing during use of the filter assembly. In another arrangement, the separator member is preferably loosely nested in the filtering chamber, and particularly in the sump region thereof.

In at least one alternative embodiment, the separator member is rigid with the housing. In this way, the housing and separator member move together during use of the filter assembly to facilitate separation of the contaminants.

Preferably, the separator member includes a separator plate. That plate preferably extends across the filtering chamber between the filter media and sump region. The plate may extend entirely across that chamber.

In one embodiment the separator plate has an edge region pivotably connected to the housing for location of the plate within the filtering chamber. In an alternative embodiment, the separator member has a plurality of legs extending from the separator plate and on which the separator member stands in the filtering chamber. In yet another embodiment, the separator plate has a pair of opposite side edge regions, and the housing has a pair of opposed grooves into which the side edge regions are received so as to locate the separator plate within the filtering chamber.

Preferably, the separator member has an array of openings therethrough providing communication for the contaminants into the sump region.

The filter assembly may further include a baffle member located in the filtering chamber between the inlet port and the filter media. In this way liquid flowing into the filtering chamber impinges upon the baffle member causing at least some contaminants entrained in the liquid to deflect toward the sump region for collection therein. That baffle member may be fixed above the sump region and may extend across the filtering chamber generally perpendicular to a longitudinal axis of the inlet port. The baffle member may have an array of openings therethrough providing liquid communication between the inlet port and filter media.

BRIEF DESCRIPTION OF THE DRAWINGS

The following description refers to preferred embodiments of the filter assembly of the present invention. To facilitate an understanding of the invention, reference is made in the description to the accompanying drawings where the assembly is illustrated in those preferred embodiments. It is to be understood that the assembly is not limited to the embodiments as hereinafter described and as illustrated in the drawings.

In the drawings, where like components are identified by the same numerals:

FIG. 1 is a side view of a filter assembly according to one preferred embodiment of the present invention;

FIG. 2 is top plan view of the filter assembly of FIG. 1;

FIG. 3 is a sectional side view through section III—III of FIG. 1;

FIG. 4 is a sectional plan view through section IV—IV of FIG. 3;

FIG. 5 is a perspective view of the separator member of the filter assembly of FIG. 1;

FIG. 6 is an end view of a filter assembly according to another preferred embodiment of the present invention;

FIG. 7 is a sectional side view through section VII—VII of FIG. 6;

FIG. 8 is a sectional plan view through section VIII—VIII of FIG. 7;

FIG. 9 is a perspective view of the separator member of the filter assembly of FIG. 6;

FIG. 10 is a sectional side view of a filter assembly according to a further preferred embodiment of the present invention;

FIG. 11 is an end view of a filter assembly according to yet another preferred embodiment of the present invention;

FIG. 12 is a sectional side view through section XII—XII of FIG. 11;

FIG. 13 is a sectional plan view through section XIII—XIII of FIG. 12; and,

FIG. 14 is an exploded perspective view of part of the housing and separator member of the filter assembly of FIG. 11.

DESCRIPTION OF THE PREFERRED EMBODIMENTS

Referring to the drawings there is generally shown alternative embodiments of filter assembly 1. Assembly 1 has housing 2 defining filtering chamber 3. Housing 2 has an inlet tube 4 providing inlet port 5 communication with chamber 3, and also outlet tube 6 providing outlet port 7 communicating with chamber 3. As shown, inlet tube 4 and/or outlet tube 6 may project a short distance into chamber 3 so that inlet port 5 and/or outlet port 7 are located within chamber 3.

Tubes 4, 6 are constructed for connection to liquid flow lines (not shown) so that liquid in the flow lines can flow through port 5 into chamber 3 and therefrom through port 7.

Inlet and outlet ports 5, 7 are co-axial and located toward opposite ends of housing 2. As shown, filter assembly 1 of FIGS. 1 to 5 is intended for generally vertical, upward flow of liquid, whilst filter assemblies 1 of FIGS. 6 to 9, FIG. 10, and FIGS. 11 to 14 are each intended for generally horizontal flow of liquid.

Housing 2 is of a generally enclosed cylindrical shape, although other shapes may be equally suitable. Housing 2 includes open ended body 8 and closure cap 9, which may be removable for access to filtering chamber 3, such as for maintenance. Cap 9 can be secured to body 8 through any suitable connection arrangement, such as by means of snap connection 10, or a screw thread connection (not shown).

Housing 2 is of a generally integral construction. To that end, inlet tube 4 can be molded or cast integral with body 8, whilst outlet tube 6 can be molded or cast integral with cap 9. It should be appreciated that, in particular, tubes 4, 6 may be otherwise connected to body 8 and cap 9.

Housing 2 may be constructed of any suitable materials. Selection of materials may depend on the liquid to be filtered. In these embodiments, housing 2 is composed at least in part of transparent or translucent material to allow at least partial visual inspection of filtering chamber 3. Conveniently, housing 2 is composed of plastics material.

Filter assembly 1 includes filter media 11 in chamber 3 for filtering contaminants from liquid flowing therethough. Filter media 11 is particularly constructed for removing solid particulates from the liquid. Filter media 11 is fixed in the filtering chamber 3 in a position spaced from inlet port 5 but extending about outlet port 7.

Filter media 11 is in the form of filter cartridge 12 in these embodiments. Cartridge 12 is mounted in chamber 3 and includes generally annular filter member 13 and end caps 14, 15. In these embodiments, filter member 13 is composed of filter sheet material corrugated or pleated into its annular configuration so as to define inner chamber 16. Filter member 13 may be of any other suitable construction and, by way of example, may be composed of foam material.

End caps 14, 15 may be interferingly fitted over filter member 13 to assist in retaining the filter sheet material in the corrugated or pleated configuration. The filter sheet material may be paper or cardboard based material.

End cap 14 is closed, whilst end cap 15 has aperture 17 therein into which outlet tube 6 projects for communication with inner chamber 16 of filter member 13. Filter member 13 is fixed in position in chamber 3 by rigid connection of end cap 15 to outlet tube 6, although may be removable therefrom for cleaning and/or replacement. With this arrangement, liquid entering through inlet port 5 into chamber 3 can flow through filter member 13 into inner chamber 16 and then directly into outlet port 7. In flowing through filter member 13, contaminants entrained in the liquid are trapped by filter member 13 in a typical filtering action. Inlet port 5 is orientated so as to perpendicularly face toward closed end cap 14 of filter member 13. In this way, liquid entering through inlet port 5 into chamber 3 tends to impinge upon end cap 14 which can assist in separation and removal of the contaminants from the liquid. In particular, upon impingement some contaminants will be directed downwardly toward the sump region 18 rather than into the filter member 13, thereby prolonging the life of the filter member 13.

Included within filtering chamber 13 is sump region 18 into which contaminants in the liquid can be collected clear of filter member 13. Housing 2 is suitably shaped to accommodate sump region 18. To that end, sump region 18 may be located entirely in housing body 8 (as shown in the assembly of FIGS. 1 to 5) or in body 8 and cap 9 (as shown in the assemblies of FIGS. 6 to 9, FIG. 10, and FIGS. 11 to 14).

Sump region 18 is generally located at the bottom of chamber 3, beneath filter media 11 and also below inlet and outlet ports 5,7. Moreover, sump region 18 is positioned so as to be out of facing relation with inlet port 5. As shown, the inlet port 5 does not face toward the sump region 18 but rather away from or in generally side-by-side spaced relation thereto. Thus, contaminants entrained in liquid entering filtering chamber 3 through inlet port 5 can move under influence of gravity toward sump region 18, whilst the liquid flows toward the filter media 11 and outlet port 7.

Assembly 1 also includes separator member 19 located in the filtering chamber 3, and substantially separating filter media 11 from sump region 18. Separator member 19 facilitates separation of gravitating contaminants from the liquid and also acts to trap or retain those contaminants received in sump region 18.

Separator member 19 is located beneath filter media 11 and also spaced below a level of the inlet and outlet ports 5,7. Separator member 19 comprises a single separator plate 20 extending across chamber 3, spaced beneath inlet 5 and dividing filter media 11 from sump region 18. Plate 20 has an array of openings 21 therethrough for communication into sump region 18. In these embodiments, openings 21 are a regular grid array of circular holes between about 1 and 3 mm in diameter, although other opening arrays, shapes and sizes are envisaged, depending at least to some extent on the type of liquid and contaminants flowing through assembly 1. In an alternative embodiment (not shown) separator plate 20 may be composed of suitable graded mesh material.

Separator member 19 is intended to be subjected to limited movement during use of assembly 1. That movement is continuous vibration and is caused by vibration of housing 2 during use of assembly 1. In the exemplary application of assembly 1, vibration will be the result of associated engine operation and/or engine movement. Vibration of separator member 19 will be in directions of a general plane of member 19 and/or laterally of that plane.

In the filter assemblies 1 of FIGS. 1 to 10, movement of separator member 19 is relative to housing 2. Thus, as will be explained in more detail hereinafter, separator member 19 is located so as to vibrate within and relative to housing 2. Moreover, in the filter assembly 1 of FIGS. 11 to 14, the separator member 19 is located within housing 2 so as to move only with the housing 2 (although relative movement is also envisaged). In this arrangement, as will also be explained in more detail hereinafter, the separator member 19 is secured to housing 2 and vibrates along with housing 2.

The vibratory movement of separator member 19 (either with or relative to housing 2), and particularly plate 20, assists in separating contaminants from the liquid. In that regard, gravitating contaminants contacting plate 20 may be broken down by the vibratory effect. That is particularly so when the contaminants are conglomerates of particulate material. Moreover, the vibratory movement tends to cause any contaminants which have gravitated toward, and are resting on, plate 20 to move toward and pass through openings 21. Once collected in sump region 18, the continuous movement of plate 20 reduces the likelihood of contaminants realigning with openings 21 and passing back through them out of sump region 18. That vibratory movement also inhibits purging of sump region 18 of collected contaminants by flow of liquid around filter media 11. That is particularly so in view of the small size of openings 21 and the rapid continuous vibration of separator member 19, even though some liquid will flow through openings 21 into and out of sump region 18 on its way through filter assembly 1.

Trapping of contaminants in sump region 18 removes those contaminants from filter media 11. That in turn may preserve the filtering integrity of filter member 13, thereby prolonging the operational life of assembly 1. In particular, removal of contaminants from filter member 13 prevents those contaminants from clogging, damaging or otherwise inhibiting the filtering effect of member 13.

In the embodiments shown in FIGS. 1 to 5 and FIGS. 6 to 9, separator member 19 is shaped and sized so as to be loosely located in chamber 3. In this way, member 19 will tend to rattle during use of assembly 1 to cause the necessary vibratory movement.

In those assembly embodiments, separator member 19 includes a plurality of support legs 22 (such as two as shown) projecting from separator plate 20. Plate 20 stands on support legs 22 which bear on housing 2 in order to correctly locate separator plate 20. In an alternative arrangement (not shown) the support legs may be provided by housing 2 so that plate 20 bears on them.

The location of member 19 is such that plate 20 will vibrate without rotating in its general plane. In the assembly embodiment of FIGS. 1 to 5 that is achieved by providing housing 2 with location legs 23 which loosely engage in cut outs 24 in plate 20, whilst in the assembly embodiment of FIGS. 6 to 9 that is achieved by suitable shaping of plate 20. Where assembly 1 can be dismantled for cleaning or other maintenance, then separator member 19 is removable from housing 2.

In the embodiment shown in FIG. 10, separator plate 20 has one edge region 25 hingedly connected through connection 26 to housing 2 so as to generally locate member 19 but permit vibratory movement thereof relative to housing 2 as housing 2 is moved. Member 19 may include at least one support leg (not shown) extending from plate 20 remote from connection 26 in order to support plate 20.

In the further embodiment shown in FIGS. 11 to 14, separator plate 20 has opposite side edge regions 29 received within respective mounting grooves 30 opening into the filtering chamber 3 in opposed relationship to one another, the grooves being spaced from the top and bottom walls and extending generally perpendicularly from one of the end walls to the other of the end walls. Each groove 30 is provided by a pair of spaced apart mounting rails 31 extending along opposite side walls of housing body. Mounting rails 31 are formed integral with the housing body 8 in this embodiment. Side edge regions 29 and grooves 30 are relatively shaped and sized, in this embodiment, so that the side edge regions 29 are firmly, slidingly received within the grooves 30. In this way, separator plate 20 is not free to vibrate or otherwise move relative to housing 2 during use of assembly 1. In a modified arrangement of this embodiment, the side edge regions 29 and grooves 30 may be shaped and sized to permit relative movement between separator plate 20 and housing 2. Thus, grooves 30 may be relatively widened so as to loosely, slidingly receive side edge regions 29 thereby allowing the separator plate to rattle or vibrate relative to housing 2 during assembly use.

It should be appreciated that separator member 19 may be otherwise located in chamber 3.

Conveniently, separator member 19 is of a one-piece construction. Member 19 may be composed of any suitable material, such as plastics material or metal.

Assembly 1 may optionally include baffle member 27 in filtering chamber 3 to assist in removing contaminants from the liquid. Baffle member 27 is fixed between inlet port 5 and end cap 14 of filter cartridge 12, and extends at least substantially perpendicular to the flow of liquid entering through inlet port 5. In this way, liquid flowing into chamber 3 tends to impinge upon member 27. This can have an effect on some contaminants that they are immediately redirected downwardly toward sump region 18 and separator member 19, rather than onto filter member 13. To this extent, filter media 11 is protected against contact from those contaminants, which may in turn prolong filter assembly life.

Baffle member 27 has an array of openings 28 for communication of liquid therethrough to filter media 11. Openings 28 may be of a similar configuration to openings 21.

In operation of filter assembly 1, liquid with entrained contaminants flows through inlet port 5 and initially impacts upon end cap 14 (and/or baffle member 27 if present). Thereafter, the liquid flows around and through filter cartridge 12 into inner chamber 16 before passing through outlet port 7. During passage of the liquid through chamber 3, entrained contaminants are progressively removed from the liquid by action of filter media 11, separator member 19 and baffle member 27. Many of the contaminants will gravitate toward and collect in sump region 18, with the remaining contaminants collecting on filter member 13.

The filter assembly of the present invention has an extended effective or operational life when compared with prior similar assemblies.

Finally, it should be appreciated that various modifications and/or alterations may be made to the filter assembly without departing from the ambit of the present invention as defined in the claims appended hereto.

We claim:

1. A filter assembly for filtering contaminants from a liquid, comprising:
    a housing providing a filtering chamber and having an inlet port and an outlet port communicating with the filtering chamber for flow of liquid through the filtering chamber, the housing having opposed top and bottom walls, a pair of opposed aide walls extending between the top and bottom walls, and a pair of opposed end walls, said inlet port being located in one of said end walls and said outlet port being located in the other of said end walls, the housing further having a pair of elongate mounting grooves extending along the sidewalls and opening into the filtering chamber in opposed relationship to one another, the mounting grooves being spaced from said top and bottom walls and extending generally perpendicularly from one of said end walls to the other of said end walls;
    filter media in the filtering chamber adjacent said outlet port for filtering contaminants from liquid flowing through the filter media to the outlet port;
    a sump region int eh filtering chamber proximate the bottom wall of the housing, the sump region being spaced from the inlet port and toward which contaminants in the liquid entering the filtering chamber through the inlet port tend to gravitate for collection; and
    a separator member located in the filtering chamber and substantially separating the filter media and the sump region, the separator member comprising a separator plate extending substantially across the filtering chamber between the filter media and the sump region, the separator plate having an array of openings therethrough and a pair of opposite side edge portions slidingly received in the mounting grooves, whereby the array of openings through the separator plate providing for gravitation of the contaminants into the sump region and the separator plate tending to trap contaminants received in the sump region.

2. A filter assembly as claimed in claim 1, and further including a baffle member located in the filtering chamber between the inlet port and the filter media so that liquid flowing into the filtering chamber impinges upon the baffle member causing at least some contaminants entrained int the liquid to deflect toward the sump region for collection therein.

3. A filter assembly as claimed in claim 2, wherein the baffle member is located adjacent the sump region and extends across the filtering chamber generally perpendicular to a longitudinal axis of the inlet port.

4. A filter assembly as claimed in claim 3, wherein the baffle member has an array of openings therethrough providing liquid communication between the inlet port and filter media.

5. A filter assembly as claimed in claim 1, wherein the side edge portions of the separator plate are loosely received in the mounting grooves so that the separator plate vibrates relative to the housing during use of the filter assembly to facilitate separation of the contaminants from the liquid and collection in the sump region.

6. A filter assembly as claimed in claim 1, wherein the side edge portions of the separator plate are firmly, slidingly received in the mounting grooves so that the separator plate is rigidly mounted in the housing and the housing and separator plate move together during use of the filter assembly to facilitate separation of the contaminants from the liquid and collection in the sump region.

7. A filter assembly as claimed in claim 1, wherein the filter media is axially spaced from said inlet port so that contaminants in the liquid entering through the inlet port can gravitate to the separator member before the liquid entering from the inlet port flows through the filter media.

8. A filter assembly as claimed in claim 1, wherein the filter media extends about the outlet port so that liquid flowing form the filter media flows directly into the outlet port.

9. A filter assembly as claimed in claim 8, wherein the housing includes an outlet tube projecting into the filtering chamber and providing the outlet port, and the filter media includes a filter cartridge connected to the outlet tube.

10. A filter assembly as claimed in claim 1, wherein the inlet port is positioned so as to be out of facing relation with the sump region.

11. A filter assembly as claimed in claim 1, wherein the filter media includes a filter cartridge having a closed end and the inlet port is positioned so as to be in facing relation with the closed end.

12. A filter assembly as claimed in claim 1, wherein the inlet and outlet ports are axially aligned with one another.

13. A filter assembly as claimed in claim 12, wherein the inlet and outlet ports are aligned substantially horizontally relative to a force of gravity during use of the filter assembly.

14. A filter assembly for filtering contaminants from liquid, comprising:
    a housing providing a filtering chamber, the housing having opposed top and bottom walls, a pair of opposed side walls extending between the top and bottom walls, and a pair of opposed end walls, and further having an inlet tube providing an inlet port through one of said end walls and an outlet tube providing an outlet port through the other of said end walls communicating with the filtering chamber for flow of liquid therethrough, the inlet and outlet tubes being axially aligned with one another, the housing further having a pair of elongate mounting grooves extending along the housing sidewalls and opening into the filtering chamber in opposed relationship to one another, said grooves being spaced from said top and bottom walls and extending generally perpendicularly from one of said end walls to the other of said end walls;

a filter cartridge in the filtering chamber for filtering contaminants from liquid flowing through the filter cartridge to the outlet port, the filter cartridge being rigidly connected to the outlet tube and surrounding the outlet port so that liquid flowing through the filter cartridge flows directly into the outlet port;

a sump region in the filtering chamber proximate the bottom wall of the housing, the sump region being spaced from the inlet port and filter cartridge and toward which contaminants in the liquid entering the filtering chamber through the inlet port tend to gravitate for collection; and a separator member located in the filtering chamber adjacent the filter cartridge and substantially separating the filter cartridge and sump region, the separator member comprising a separator plate extending across the filtering chamber between the filter cartridge and sump region, the separator plate having an array of openings therethrough and a pair of opposite side edge portions loosely and slidingly received in the mounting grooves, the side edge portions connecting the separator plate to the housing, whereby the separator member is capable of moving relative to the housing during use of the filter assembly, that movement facilitating separation of the contaminants from the liquid entering through the inlet port and collection of the contaminants in the sump region through gravitation, the array of openings through the separator plate adjacent the filter cartridge providing for gravitation of the contaminants into the sump region and the separate plate tending to trap the contaminants received in the sump region.

15. A filter assembly as claimed in claim 14, wherein the housing includes pairs of spaced-apart mounting rails extending along opposite walls of the housing, each pair of mounting rails defining a respective one of the mounting grooves therebetween, each side edge region of the separator plate slidingly received between a respective said pair of mounting rails to connect the separator plate to the housing.

* * * * *

UNITED STATES PATENT AND TRADEMARK OFFICE
CERTIFICATE OF CORRECTION

PATENT NO. : 5,234,589
DATED : August 10, 1993
INVENTOR(S) : Marino R. Sussich and Paul J. Sussich It is certified that error appears in the above-identified patent and that said Letters Patent is hereby corrected as shown below:

```
In column 3, line 1, after "is" insert --a--.
In column 7, line 36, for "aide" read --side--.
In column 8, line 6, for "int" read --in--.
In column 8, line 38, for "form" read --from--.
In column 10, line 16, for "separate" read --separator--.
In column 10, line 20, after "each" insert --said--.
```

Signed and Sealed this

Twelfth Day of April, 1994

Attest:

BRUCE LEHMAN

*Attesting Officer*     *Commissioner of Patents and Trademarks*